United States Patent
Na et al.

(10) Patent No.: US 11,424,042 B2
(45) Date of Patent: Aug. 23, 2022

(54) NUCLEAR-FUEL SINTERED PELLETS BASED ON OXIDE IN WHICH FINE PRECIPITATE MATERIAL IS DISPERSED IN CIRCUMFERENTIAL DIRECTION AND METHOD OF MANUFACTURING SAME

(71) Applicant: KEPCO NUCLEAR FUEL CO., LTD., Daejeon (KR)

(72) Inventors: Yeon Soo Na, Daejeon (KR); Kwang Young Lim, Seoul (KR); Tae Sik Jung, Sejong (KR); Min Jae Ju, Sejong (KR); Yoon Ho Kim, Daejeon (KR); Seung Jae Lee, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 44 days.

(21) Appl. No.: 16/929,614

(22) Filed: Jul. 15, 2020

(65) Prior Publication Data
US 2021/0202115 A1    Jul. 1, 2021

(30) Foreign Application Priority Data
Dec. 30, 2019   (KR) ........................ 10-2019-0178096

(51) Int. Cl.
*G21C 3/04*     (2006.01)
*G21C 3/60*     (2006.01)
*G21C 3/62*     (2006.01)

(52) U.S. Cl.
CPC ............. *G21C 3/045* (2019.01); *G21C 3/041* (2013.01); *G21C 3/047* (2019.01); *G21C 3/60* (2013.01);
(Continued)

(58) Field of Classification Search
CPC ........ G21C 3/048; G21C 3/041; G21C 3/047; G21C 3/045; G21C 3/60; G21C 3/62;
(Continued)

(56) References Cited

U.S. PATENT DOCUMENTS

| | | | |
|---|---|---|---|
| 2005/0195933 A1* | 9/2005 | Dorr | G21C 3/62 376/417 |
| 2012/0098149 A1* | 4/2012 | Yang | G21C 21/02 264/0.5 |

(Continued)

FOREIGN PATENT DOCUMENTS

| | | |
|---|---|---|
| KR | 20000033456 A | 6/2000 |
| KR | 20040047522 A | 6/2004 |

(Continued)

OTHER PUBLICATIONS

Wang, Hui et al., Research on the preparation and sintering process of (U,Ti) O2 dispersion fuel microsphere, Journal of Alloys and Compounds, 2013, pp. 305-310, vol. 579, Elsevier.

*Primary Examiner* — Darlene M Ritchie
(74) *Attorney, Agent, or Firm* — Levenfeld Pearlstein, LLC (57) ABSTRACT

Provided is a nuclear-fuel sintered pellet based on oxide in which a plate-type fine precipitate material in a base of a sintered pellet of uranium dioxide, used as nuclear fuel in nuclear power plants, is uniformly dispersed in a matrix of uranium dioxide fuel thereof so as to form a donut-shaped precipitate cluster, and to a method of manufacturing the same. The plate-type fine precipitate material is uniformly precipitated in a tissue thereof or forms a donut-shaped precipitate cluster having a two-dimensional structure through dispersion to improve thermal and physical performance of the nuclear-fuel sintered pellet of uranium dioxide, whereby the creep deformation rate and thermal conductivity of the sintered pellet are improved. The nuclear-fuel
(Continued)

sintered pellet based on oxide can reduce the Pellet-Clad Interaction (PCI) failure and the core temperature of nuclear fuel when an accident occurs, thereby significantly improving the safety of a nuclear reactor.

19 Claims, 7 Drawing Sheets

(52) U.S. Cl.
CPC ............... *G21C 3/62* (2013.01); *G21C 3/623* (2013.01); *G21C 3/048* (2019.01)

(58) Field of Classification Search
CPC . G21C 3/623; G21C 3/58; G21C 3/07; G21C 21/02; Y02E 30/30; Y10S 376/901
USPC .......................................... 376/409, 426, 431
See application file for complete search history.

(56) References Cited

U.S. PATENT DOCUMENTS

| | | | | |
|---|---|---|---|---|
| 2012/0257707 A1* | 10/2012 | Ahlfeld | ................... | G21C 3/623 376/409 |
| 2013/0240805 A1* | 9/2013 | Kang | ................... | G21C 3/623 252/638 |
| 2016/0232993 A1* | 8/2016 | Kurina | ................... | G21C 3/044 |

FOREIGN PATENT DOCUMENTS

| | | | | |
|---|---|---|---|---|
| KR | 101652729 B1 | 9/2016 | | |
| WO | WO-2020135404 A1 * | 7/2020 | ............. | C22C 29/04 |

\* cited by examiner

NUCLEAR-FUEL SINTERED PELLETS BASED ON OXIDE IN WHICH FINE PRECIPITATE MATERIAL IS DISPERSED IN CIRCUMFERENTIAL DIRECTION AND METHOD OF MANUFACTURING SAME

CROSS REFERENCE TO RELATED APPLICATION

The present application claims priority based on Korean Patent Application No. 10-2019-0178096, filed Dec. 30, 2020, the entire content of which is incorporated herein for all purposes by this reference.

BACKGROUND OF THE INVENTION

1. Field of the Invention

The present invention relates to an nuclear-fuel pellets based on uranium dioxide in which a plate-type fine precipitate material in a base of a sintered pellet based on uranium dioxide, used as nuclear fuel in nuclear power plants, is uniformly dispersed in a matrix of nuclear-fuel sintered pellet thereof so as to form a donut-shaped precipitate cluster, and to a method of manufacturing the same. More particularly, the present invention relates to an nuclear-fuel pellet based on uranium dioxide in which a plate-type fine precipitate material is uniformly precipitated in a matrix of nuclear-fuel sintered pellets thereof or forms a donut-shaped precipitate cluster having a two-dimensional structure by dispersion in order to improve the thermal and physical performance of the uranium dioxide nuclear-fuel pellet, whereby the creep deformation rate and thermal conductivity of the nuclear-fuel sintered pellets are improved, thus overcoming the problem of reduced safety due to the low creep deformation rate and thermal conductivity characteristics of the uranium dioxide nuclear-fuel sintered pellets, and to a method of manufacturing the same. The nuclear-fuel sintered pellets are capable of reducing the Pellet-Clad Interaction (PCI) failure and the core temperature of nuclear fuel when an accident occurs, thereby significantly improving the safety of a nuclear reactor.

2. Description of the Related Art

In nuclear power generation, heat generated through nuclear fission is used. Nuclear fuel assemblies are manufactured by bundling hundreds of fuel rods loaded with the uranium dioxide nuclear-fuel sintered pellet, which is a nuclear fuel material. The nuclear fuel assembles are loaded and used in the core of pressurized-water-reactor-type and pressurized-heavy-water-reactor-type nuclear reactors, and the heat generated due to nuclear fission in the sintered pellet is transferred via the sintered pellet to the cooling water flowing around the fuel rods through a clad tube. The nuclear fuel pellet, which is the heat source of a nuclear power plant, is manufactured in the form of a cylindrical sintered pellet by molding and sintering oxides of uranium, plutonium, and thorium or mixed materials thereof. Currently, uranium dioxide is used as a nuclear-fuel sintered pellet for commercial nuclear power plants around the world.

In the case of the above-described uranium oxide sintered pellet, uranium dioxide powder is used as a starting material, and a lubricant is added thereto, followed by mixing and pre-molding at a pressure of about 1 ton/cm$^2$, thus manufacturing a slug. The slug is crushed to manufacture granules. A lubricant is added to the granules that are manufactured and mixed therewith, followed by uniaxial compression molding. The fabricated green pellet is sintered in a hydrogen-containing gas atmosphere at a sintering temperature of up to 1780° C., thus manufacturing the sintered body. The uranium oxide sintered pellet manufactured through the above process is typically cylindrical, and has a density satisfying about 95% of a theoretical density.

Further, plutonium oxide or thorium oxide powder may be mixed with uranium dioxide powder, and the same procedure as in the method of manufacturing the uranium oxide may then be performed, thus manufacturing (U, Pu)O$_2$ and (U, Th)O$_2$ sintered pellets. Gadolinia oxide powder may be mixed with the uranium oxide powder, and a procedure similar to that of the method of manufacturing uranium oxide may then be performed, thus manufacturing a (U, Gd)O$_2$ sintered pellet, which is a nuclear fuel as a burn-able absorber.

Meanwhile, uranium dioxide (UO$_2$), which is nuclear fuel for commercial nuclear power plants, has a very high melting point of about 2850° C. and very low reactivity with cooling water, and thus has been widely used as a nuclear fuel to date. However, uranium dioxide has a very low thermal conductivity of about 2 to 3 W/mK in the operating temperature range of the nuclear power plant, and the crystal grain size thereof is small, so the fracturing of fuel rods may be promoted due to a nuclear fission gas release rate and pellet-clad interaction. In particular, because of the low thermal conductivity of uranium dioxide, when the heat produced due to nuclear fission is not easily transferred to the cooling water, the nuclear fuel sintered pellet has a temperature that is much higher than that of the cooling water, the center temperature of the sintered body is increased, and a steep temperature gradient occurs in the sintered body. Due to this thermal characteristic, all temperature-dependent reactions are accelerated, and the performance of the material is remarkably reduced, resulting in a lower margin for the safety of nuclear power plants.

Further, damage to fuel rods caused by PCI occurs when the clad tube and the sintered body come into contact with each other at 30 GWD/MTU or higher, and from this time, the sintered body exerts external force in the radial direction of the clad tube, which causes mechanical deformation, resulting in breakage. However, in the case of nuclear fuel sintered pellets having large grain microstructure resulting from added oxides, before the occurrence of deformation of the clad tube, plastic deformation of a nuclear-fuel sintered pellet occurs, and mutual stress with the clad tube resulting from volume expansion due to heat is relieved. In addition, the area of the crystal grain boundary, acting as a channel through which various types of nuclear fission gases generated in the course of the nuclear reaction are capable of escaping, is reduced, thereby reducing the rate of release of nuclear fission gas to the outside of the nuclear fuel pellet. Therefore, the nuclear fission gas that deteriorates the inner surface of the fuel rod may be collected into the nuclear fuel pellet, thereby weakening the damage behavior caused by stress corrosion cracking. The role of the sintering additive in reducing PCI damage is basically to enlarge the crystal grains of the uranium dioxide sintered pellet. This occurs because the oxide additive promotes the migration of uranium cations at the sintering temperature when uranium dioxide is sintered, and the developed microstructure serves to improve safety and the operation margin of power plants during combustion in the furnace of nuclear power plants.

Accordingly, in order to improve the thermal conductivity of uranium dioxide as described above, Korean Patent No. 10-0609217 discloses a nuclear fuel containing a tungsten metal network and a method of manufacturing the same. In detail, the patent discloses a method of manufacturing a nuclear-fuel sintered body including a tungsten metal network, and the method includes heating a molded body containing nuclear fuel powder and tungsten oxide in a reducing gas atmosphere to thus manufacture a pre-sintered pellet, heating the pre-sintered pellet in an oxidative gas atmosphere to thus form a liquid network of tungsten oxide in the pre-sintered pellet, and reducing the liquid network of tungsten oxide.

Further, Korean Patent No. 10-1652729 discloses a method of manufacturing a nuclear-fuel sintered pellet, and in the method, a thermally conductive micro-sized metal powder is used so that oxidation of the metal material occurring during the manufacture of the sintered pellet is prevented, thereby overcoming the problem of reduced thermal conductivity of the sintered pellet. Further, a plate-type metal powder is used to further improve the homogeneity of the microstructure of the sintered pellet, thereby manufacturing a nuclear-fuel sintered pellet having excellent thermal conductivity.

However, in a conventional technology of homogenously distributing oxides, which are formed in a liquid phase, along the crystal grain boundary of the sintered pellet, the oxidation characteristics of the added metal are not taken into consideration. Accordingly, there is the possibility of volatilization, and poor microstructure may be formed on the surface of the sintered pellet. From the aspect of commercial manufacture, it is almost impossible to manufacture the sintered pellet in large quantities.

Accordingly, the present inventors have studied a method capable of improving both the mechanical and thermal properties of a nuclear-fuel sintered pellet based on uranium dioxide, and have found that the thermal conductivity is improved and the grain size is increased by 30 μm or more by uniformly dispersing a plate-type fine precipitate material in a circumferential direction in the base of uranium dioxide and by disposing the precipitate material so as to form a donut-shaped two-dimensional cluster, whereby the compression creep properties of the sintered pellet are greatly improved, thus greatly increasing PCI resistance. Thereby, the present invention was accomplished.

PRIOR ART DOCUMENT

Patent Document

Korean Patent No. 10-0609217 (Registration date: 2006 Jul. 27)
Korean Patent No. 10-1652729 (Registration date: 2016 Aug. 25)

SUMMARY OF THE INVENTION

The present invention provides a nuclear-fuel sintered pellet having a microstructure in which a plate-type fine precipitate material is dispersed in a circumferential direction and also having a donut-shaped two-dimensional cluster so as to satisfy both resistance to creep deformation and excellent thermal conductivity, and a method of manufacturing the same.

An aspect of the present invention is a nuclear-fuel sintered pellet manufactured using an oxide to which at least one of a group including uranium (U), plutonium (Pu), gadolinium (Gd), and thorium (Th) is added. The nuclear-fuel sintered pellet includes a precipitate material, generated due to a sintering additive during a sintering process, in the microstructure of sintered pellet thereof. The precipitate material is uniformly dispersed in a circumferential direction.

The precipitate material may form a donut-shaped two-dimensional precipitate cluster.

The precipitate material may be disposed along a crystal grain boundary of uranium dioxide.

The precipitate material may have a length of 3 to 30 μm and a thickness of 1 to 10 μm.

The sintering additive may include at least one of a group including copper (I) oxide (CuO), copper (II) oxide ($Cu_2O$), chromium carbide ($Cr_{23}C_6$), molybdenum dioxide ($MoO_2$), molybdenum trioxide ($MoO_3$), molybdenum carbide ($Mo_2C$), and molybdenum disilicide ($MoSi_2$).

The sintering additive may further include titanium dioxide ($TiO_2$).

The content of titanium dioxide ($TiO_2$) may be 0.05 to 0.70 wt % based on an oxide for the nuclear-fuel sintered pellet.

The addition amount of the sintering additive may be 0.5 to 10.0 wt % based on the oxide for the nuclear-fuel sintered pellet.

The nuclear-fuel sintered pellet may further include a metal aluminum (Al) powder.

The content of the metal-aluminum powder may be 0.01 to 0.10 wt % based on the oxide for the nuclear-fuel sintered pellet.

Another aspect of the present invention provides a method of manufacturing an oxide nuclear-fuel sintered pellet in which a plate-type fine precipitate material is dispersed in a circumferential direction. The method includes mixing an oxide powder, including at least one of a group including uranium (U), plutonium (Pu), gadolinium (Gd), and thorium (Th), with a sintering additive powder, thus manufacturing a mixed powder (first step), manufacturing a granulated powder using a sieve after pre-compressing and crushing the mixed powder (second step), uniaxially compressing the granulated powder at 300 to 500 MPa, thus manufacturing a nuclear-fuel green pellet (third step), performing primary sintering of the manufactured nuclear-fuel green pellet in a hydrogen-containing reducing gas atmosphere at a sintering temperature of about 700 to 1100° C. (fourth step), and performing secondary sintering in a hydrogen-containing reducing gas atmosphere at a sintering temperature of 1700 to 1800° C. successively after the primary sintering is completed (fifth step).

The sintering additive powder may include at least one of a group including copper (I) oxide (CuO), copper (II) oxide ($Cu_2O$), chromium carbide ($Cr_{23}C_6$), molybdenum dioxide ($MoO_2$), molybdenum trioxide ($MoO_3$), molybdenum carbide ($Mo_2C$), and molybdenum disilicide ($MoSi_2$).

A sintering additive may further include titanium dioxide ($TiO_2$).

Titanium dioxide ($TiO_2$) may be included in a content of 0.05 to 0.70 wt % based on the oxide for the nuclear-fuel sintered pellet.

In the method of manufacturing the oxidative nuclear-fuel sintered pellet, a metal-aluminum (Al) oxide powder may be further added.

In the primary sintering, heating may be performed at a heating rate of 1 to 10° C./min so that sintering is performed at a condition of 300 to 1100° C. for 30 to 120 minutes, thereby maintaining a sintering additive in a liquid state.

In the secondary sintering, after completion of the primary sintering, sintering may be performed at a condition of 1700 to 1800° C. for 60 to 240 minutes at a heating rate of 1 to 10° C./min without cooling so that a sintering additive in a liquid state is precipitated into a plate-type fine precipitate material and then disposed homogeneously in a circumferential direction while crystal grains of the nuclear-fuel sintered pellet based on uranium dioxide grow.

When the sintering additive powder is copper (I) oxide (CuO) or copper (II) oxide ($Cu_2O$), in the primary sintering (fourth step), the sintering temperature may be 300 to 500° C. and the sintering time may be 30 to 120 minutes.

The hydrogen-containing reducing gas may contain at least one of a group including carbon dioxide, nitrogen, argon, and helium gases.

The hydrogen-containing reducing gas may contain only a hydrogen gas.

According to an nuclear-fuel sintered pellet based on oxide and a method of manufacturing the same according to the present invention, the nuclear-fuel sintered pellet has a microstructure in which a plate-type fine precipitate material is dispersed in a circumferential direction and also has a donut-shaped two-dimensional cluster. Accordingly, it is possible to satisfy both very high creep deformation and excellent thermal conductivity characteristics.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The specific structural or functional descriptions presented in the embodiments of the present invention are provided for the purpose of explaining the embodiments according to the concept of the present invention, and the embodiments according to the concept of the present invention may be implemented in various forms. Also, the present invention should not be construed as being limited to the embodiments described herein, but should be understood to include all modifications, equivalents, and substitutes included in the spirit and scope of the present invention.

An aspect of the present invention is a nuclear-fuel sintered pellet manufactured using an oxide to which at least one of a group including uranium (U), plutonium (Pu), gadolinium (Gd), and thorium (Th) is added. The nuclear-fuel sintered pellet includes a precipitate material, generated due to a sintering additive during a sintering process, in the microstructure of uranium dioxide thereof. The precipitate material is uniformly dispersed in a circumferential direction.

The precipitate material may form a donut-shaped two-dimensional precipitate cluster.

The precipitate material may be disposed along a crystal grain boundary.

The precipitate material may have a length of 3 to 30 μm and a thickness of 1 to 10 μm.

The sintering additive may include at least one of a group including copper(I) oxide (CuO), copper(II) oxide ($Cu_2O$), chromium carbide ($Cr_{23}C_6$), molybdenum dioxide ($MoO_2$), molybdenum trioxide ($MoO_3$), molybdenum carbide ($Mo_2C$), and molybdenum disilicide ($MoSi_2$). The sintering additive is reduced together with uranium dioxide in the process of sintering uranium dioxide in a reducing atmosphere, so that the sintering additive remains in the form of a precipitate material in the sintered pellet, thus increasing the thermal conductivity of the sintered pellet. Preferably, the addition amount of the sintering additive may be 0.5 to 10.0 wt % based on the oxide for the nuclear-fuel sintered pellet.

The sintering additive may further include titanium dioxide ($TiO_2$). Titanium dioxide may increase the size of crystal grains in the sintered pellet, thus increasing the compression creep deformation rate at high temperatures and improving the PCI characteristic, which expands the sintered body to thus effectively reduce the pressure applied to the clad tube. Preferably, the content of titanium dioxide ($TiO_2$) may be 0.05 to 0.70 wt % based on the oxide for the nuclear-fuel sintered pellet.

The nuclear-fuel sintered pellet based on oxide may further include metal aluminum (Al) powder. The sintering additives that are reduced and then precipitated in the uranium oxide sintered pellet serve to increase the thermal conductivity. However, the reduced precipitate material is oxidized again under a condition of high oxygen partial pressure, thus losing its function. The metal aluminum powder is reacted with oxygen to generate aluminum oxide ($Al_2O_3$) and reduce the oxygen partial pressure, thereby preventing oxidation of the reduced precipitate material. Preferably, the metal aluminum powder may be included in a content of 0.01 to 0.10 wt % based on the oxide for the nuclear-fuel sintered pellet.

Another aspect of the present invention provides a method of manufacturing nuclear-fuel sintered pellet based on oxide in which a plate-type fine precipitate material is dispersed in a circumferential direction. The method includes mixing an oxide powder, including at least one of a group including uranium (U), plutonium (Pu), gadolinium (Gd), and thorium (Th), with a sintering additive powder, thus manufacturing a mixed powder (first step), manufacturing a granulated powder using a sieve after pre-compressing and crushing the mixed powder (second step), uniaxially compressing the granulated powder at 300 to 500 MPa, thus manufacturing a nuclear-fuel green pellet (third step), performing primary sintering of the manufactured nuclear-fuel green pellet in a hydrogen-containing reducing gas atmosphere at a sintering temperature of about 700 to 1100° C. (fourth step), and performing secondary sintering in a hydrogen-containing reducing gas atmosphere at a sintering temperature of 1700 to 1800° C. successively after the primary sintering is completed (fifth step).

The sintering additive powder may include at least one of a group including copper (I) oxide (CuO), copper (II) oxide ($Cu_2O$), chromium carbide ($Cr_{23}C_6$), molybdenum dioxide ($MoO_2$), molybdenum trioxide ($MoO_3$), molybdenum carbide ($Mo_2C$), and molybdenum disilicide ($MoSi_2$).

A sintering additive may further include titanium dioxide ($TiO_2$).

Titanium dioxide ($TiO_2$) may be included in a content of 0.05 to 0.70 wt % based on the oxide for the nuclear-fuel sintered pellet.

In the method of manufacturing the nuclear-fuel sintered pellet based on oxide, a metal-aluminum (Al) oxide powder may be further added.

In the primary sintering, heating may be performed at a heating rate of 1 to 10° C./min so that sintering is performed at a condition of 300 to 1100° C. for 30 to 120 minutes, thereby maintaining a sintering additive in a liquid state.

In the secondary sintering, after completion of the primary sintering, sintering may be performed at a condition of 1700 to 1800° C. for 60 to 240 minutes at a heating rate of 1 to 10° C./min without cooling so that a sintering additive in a liquid state is precipitated into a plate-type fine precipitate material and is then disposed homogeneously in a circumferential direction while crystal grains of an nuclear-fuel sintered pellet based on oxide grow.

When the sintering additive powder is copper (I) oxide (CuO) or copper (II) oxide ($Cu_2O$), in the primary sintering (fourth step), the sintering temperature may be 300 to 500° C. and the sintering time may be 30 to 120 minutes.

The hydrogen-containing reducing gas may contain at least one of a group including carbon dioxide, nitrogen, argon, and helium gases.

The hydrogen-containing reducing gas may contain only a hydrogen gas.

The present invention will be described in detail with reference to Examples and Experimental Examples. However, this is only illustrative and does not limit the present invention in any form.

<Example 1> Manufacture of Uranium Dioxide Sintered Pellet

First step: In a method of manufacturing an nuclear-fuel sintered pellet based on oxide in which a plate-type fine precipitate material was dispersed in a circumferential direction, an oxide powder, to which at least one of a group including uranium (U), plutonium (Pu), gadolinium (Gd), and thorium (Th) was added, was mixed with a sintering additive powder, thus manufacturing a mixed powder. Uranium dioxide powder was used as the oxide powder used in the Example, and the addition amount of the sintering additive is shown in Table 1.

Second step: The mixed powder in the first step was subjected to pre-compressing (100 MPa), thus manufacturing a pre-compaction green pellet. The pre-compaction green pellet was crushed to manufacture a granulated powder using a sieve. The granulated powder had a particle size of about 400 to 800 μm.

Third step: The granulated powder manufactured in the second step was placed in a standardized mold and uniaxially compressed at 300 to 400 MPa, thus manufacturing a nuclear-fuel green pellet.

Fourth step: The uranium dioxide green pellet manufactured in the third step was subjected to primary sintering in a hydrogen-containing reducing gas atmosphere at a sintering temperature of about 700 to 1100° C. for about 30 to 120 minutes.

Fifth step: After the primary sintering was completed in the fourth step, secondary sintering was performed under a sintering temperature condition of 1700 to 1800° C. at a heating rate of 1 to 10° C./min for 60 to 240 minutes without cooling, thus manufacturing a uranium dioxide sintered pellet.

Examples 2 to 10

An nuclear-fuel sintered pellet based on oxide in which a plate-type fine precipitate material was dispersed in a circumferential direction was manufactured using the same method as in Example 1, except for the chemical compositions of the uranium dioxide powder and the sintering additive. The chemical composition of the sintering additive added to the nuclear-fuel sintered pellet based on oxide in which the fine precipitate material was dispersed in a circumferential direction is shown in Table 1.

TABLE 1

| Classification | $MoO_2$ | $Mo_2C$ | $Cr_{23}C_6$ | CuO | $Cu_2O$ | $TiO_2$ | Al |
|---|---|---|---|---|---|---|---|
| Example 1 | 5 | — | — | — | — | 0.1 | 0.01 |
| Example 2 | 3 | — | — | — | — | 0.1 | 0.05 |
| Example 3 | — | 5 | — | — | — | 0.1 | — |
| Example 4 | — | 3 | — | — | — | 0.1 | — |
| Example 5 | — | — | — | — | 3 | 0.1 | — |
| Example 6 | — | — | — | — | 5 | 0.1 | — |
| Example 7 | — | — | 5 | — | — | — | — |
| Example 8 | — | — | 3 | — | — | — | — |
| Example 9 | — | — | — | 5 | — | 0.1 | — |
| Example 10 | — | — | — | 3 | — | 0.1 | — |

<Comparative Example 1> Manufacture of Conventional Commercial Uranium Dioxide Sintered Pellet In the case of a commercially available uranium dioxide sintered pellet used as nuclear fuel in a commercial nuclear power plant, a uranium dioxide sintered pellet, manufactured using a process for manufacturing commercially available uranium dioxide sintered pellets in recent years, was used.

<Comparative Example 2> Manufacture of Uranium Dioxide Sintered Pellet not Including Aluminum The uranium dioxide sintered pellet was manufactured using the same method as in Example 1, except that aluminum was not added to the composition of the sintering additive.

<Experimental Example 1> Microstructure Analysis

Figure 1:
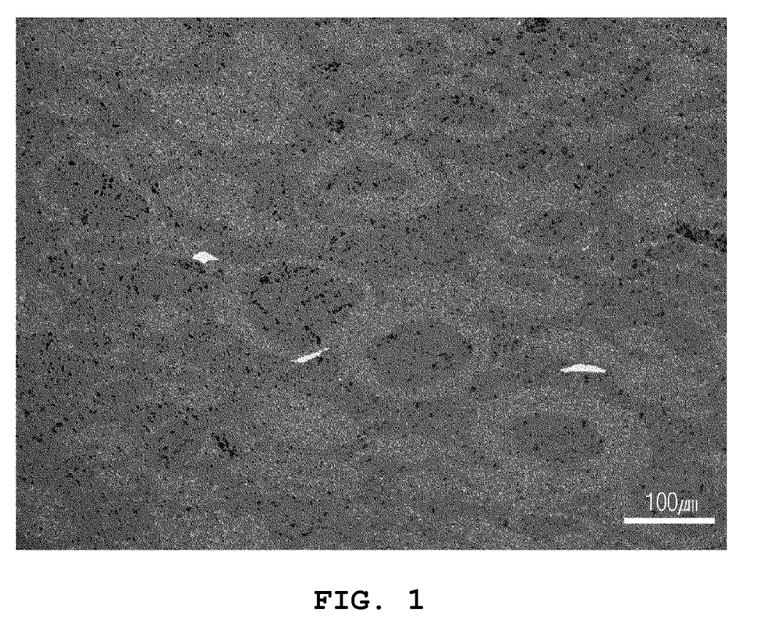
FIG. 1 shows the microstructure (100× magnification) of a uranium dioxide sintered pellet according to Example 1 of the present invention, which is taken using an optical microscope.
Figure 2:
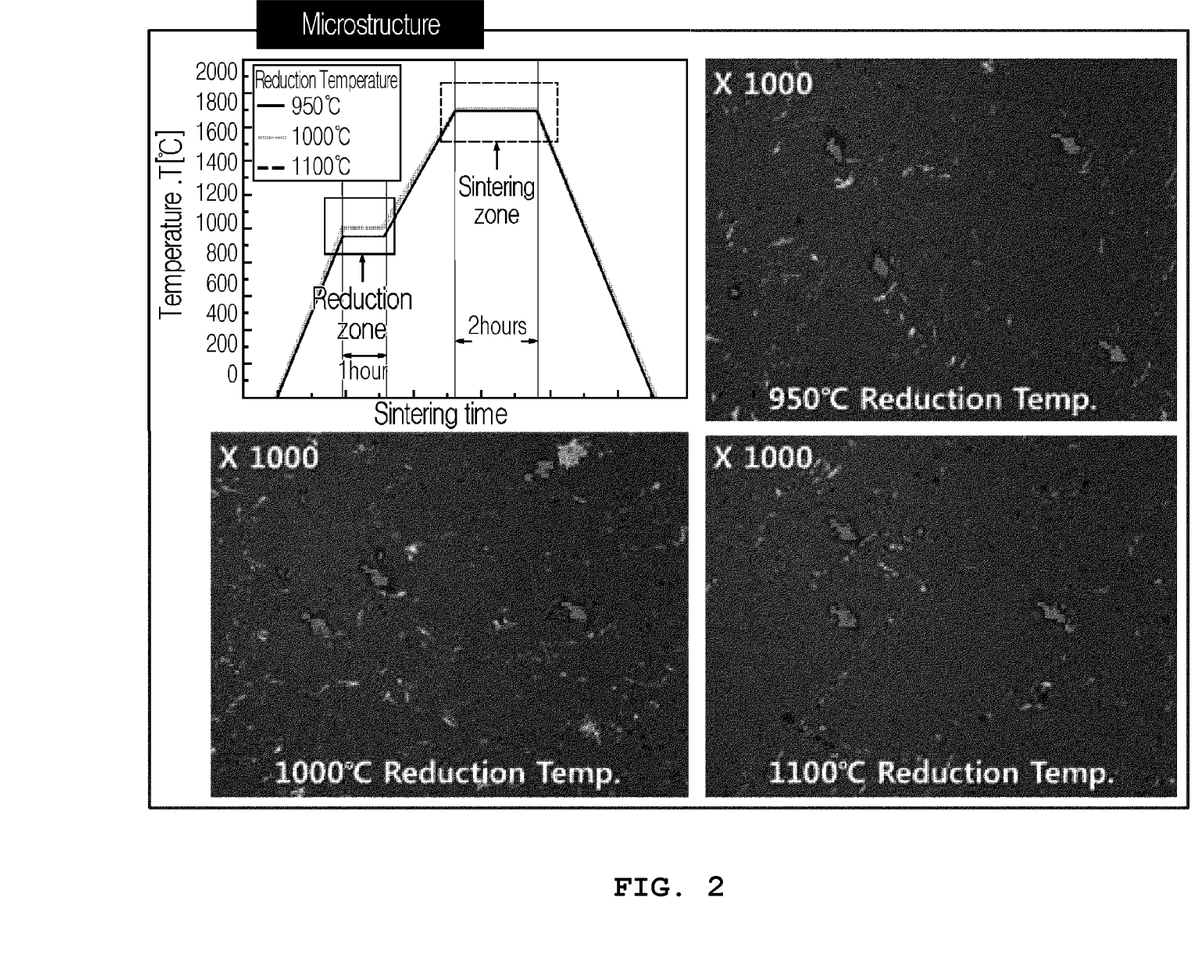
FIG. 2 is a SEM photograph showing the microstructure of the plate-type molybdenum precipitated along the crystal grain boundary of the uranium dioxide sintered pellet according to Example 1 of the present invention.
Figure 3:
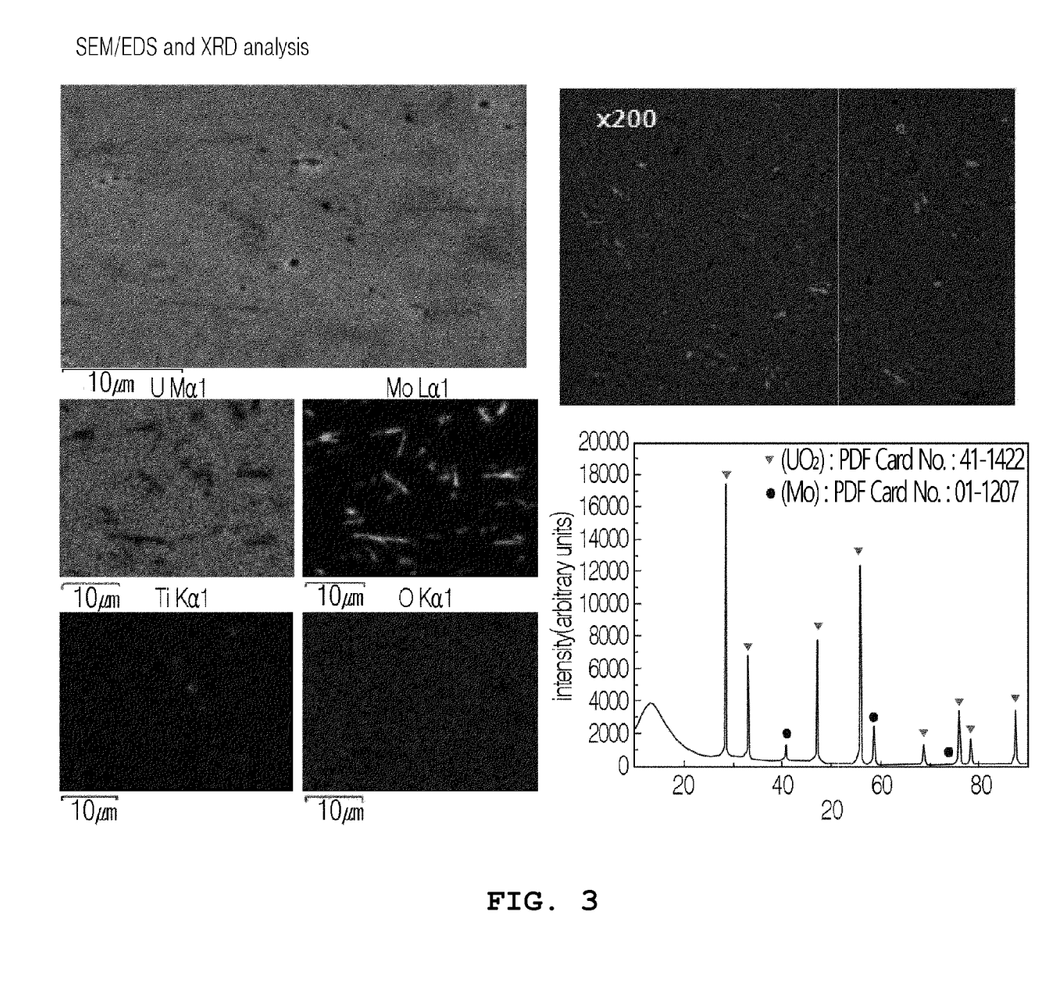
FIG. 3 shows SEM/EDS mapping photographs and XRD pattern photographs of the plate-type molybdenum precipitated along the crystal grain boundary of the uranium dioxide sintered pellet according to Example 1 of the present invention.

In order to analyze the microstructure of an nuclear-fuel sintered pellet based on oxide in which a plate-type fine precipitate material was dispersed in a circumferential direction according to Example 1 of the present invention, an optical microscope and a scanning electron microscope were used for the purpose of microstructure analysis. FIGS. 1 and 2 show the microstructure of a sintered pellet to which molybdenum dioxide, titanium dioxide, and metal aluminum are added. As shown in FIGS. 1 and 2, it was confirmed that when the added molybdenum dioxide was sintered, a plate-type metal molybdenum was precipitated along a crystal grain boundary due to the crystal grain growth in the $UO_2$ sintered pellet, caused by titanium dioxide and a chemical reaction between molybdenum dioxide and hydrogen. In particular, with respect to the arrangement of the precipitate from the plate-type metal molybdenum, the precipitate material was uniformly dispersed in a two-dimensional donut shape, and thermal conductivity was improved due to the two-dimensional donut shape and the metal molybdenum. FIG. 3 shows the analysis of the microstructure and the elements of precipitate material using a scanning electron microscope (SEM/EDS) and XRD, and it was confirmed that the plate-type molybdenum was precipitated along the crystal grain boundary of uranium dioxide. Further, from the result of XRD analysis, which uses an analytical device for analyzing a small amount of impurities and crystal structures, it was confirmed that molybdenum dioxide, that is, the additive, was completely precipitated into metal molybdenum, thus forming the precipitate materials in the uranium dioxide base.

Figure 4:
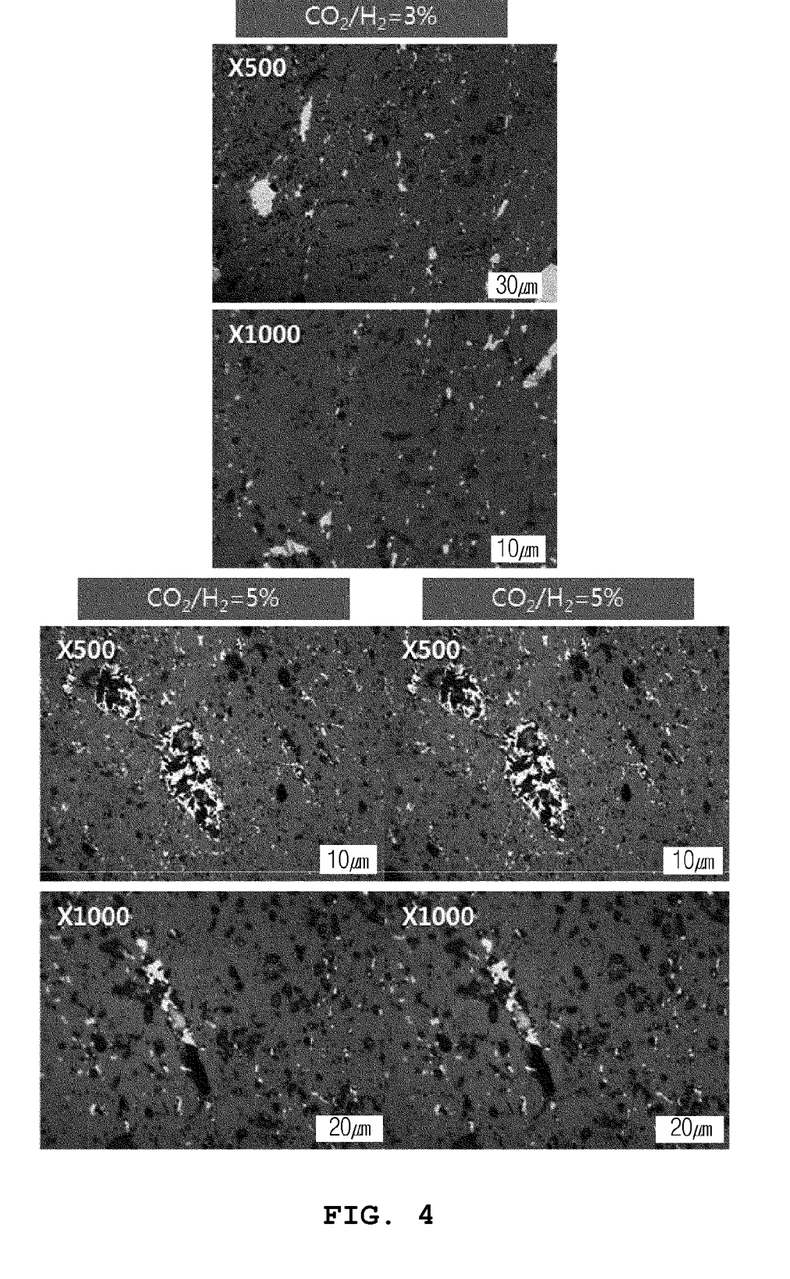
FIG. 4 is a photograph showing molybdenum (white) and molybdenum oxide (black) precipitated according to an oxygen partial pressure with respect to a uranium dioxide sintered pellet according to Comparative Example 1 of the present invention.
Figure 5:
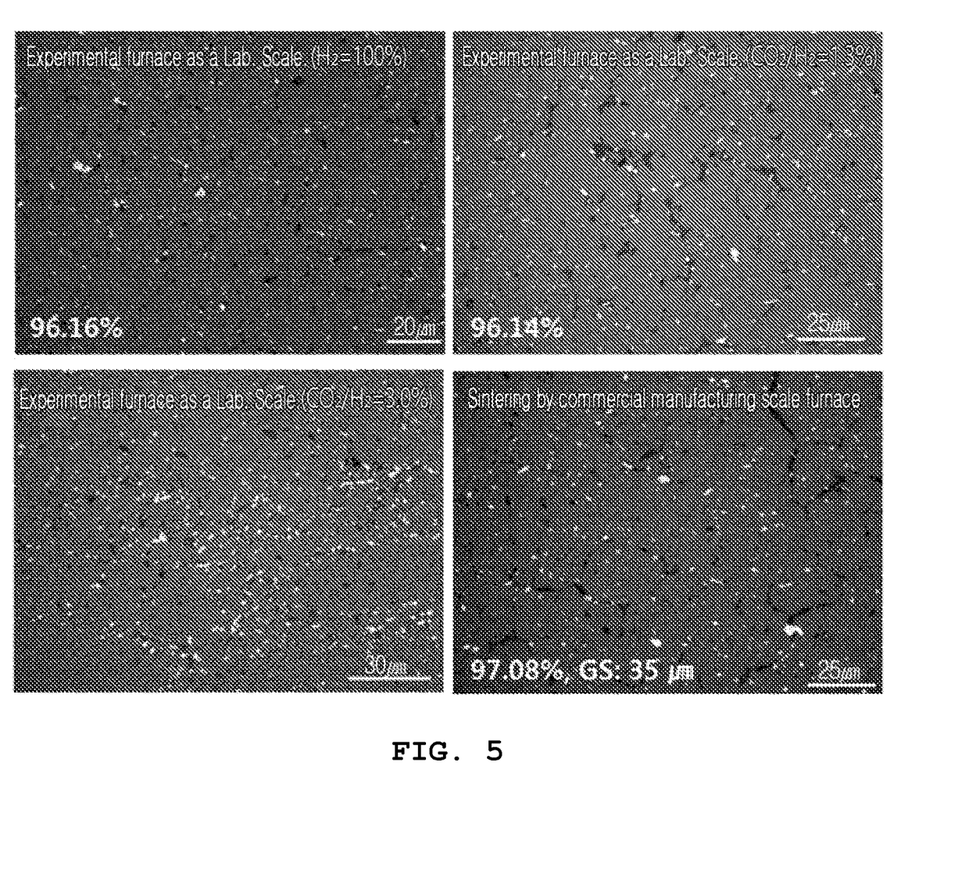
FIG. 5 is an optical photograph of microstructure, taken using a microscope, showing the result of maintaining the integrity of a molybdenum precipitate material in the base of the uranium dioxide sintered pellet by adding metal aluminum to the uranium dioxide sintered pellet according to Example 1 of the present invention using an aluminothermic method.

<Experimental Example 2> Evaluation of Integrity of Molybdenum Precipitate Material Depending on Sintering Atmosphere In order to evaluate the integrity of the precipitate material of an oxide nuclear-fuel sintered body in which a plate-type fine precipitate material was dispersed in a circumferential direction according to Comparative Example 1 and Example 1 of the present invention, the integrity of the precipitate material depending on the sintering atmosphere was evaluated. FIG. 4 shows the precipitate materials in the uranium dioxide microstructure of Comparative Example 1, manufactured under a sintering atmosphere condition in which the oxygen partial pressure of $CO_2/H_2$ was 3% and 5%. As shown in FIG. 4, there was a problem in that, as the oxygen partial pressure was increased, the precipitated molybdenum was oxidized and volatilized. This is because molybdenum, which is precipitated due to an increase in the oxygen partial pressure caused by a small amount of oxygen in residual oxygen and uranium dioxide in a sintering furnace, is oxidized into molybdenum oxides such as molybdenum trioxide ($MoO_3$) or molybdenum dioxide ($MoO_2$), thus being volatilized. Therefore, in order to prevent oxidation of the precipitate from the metal molybdenum due to residual oxygen, a small amount of metal aluminum may be added so that the residual oxygen is first reacted with metal aluminum using an aluminothermic method to thus significantly reduce the oxygen partial pressure in a sintering furnace, thereby preventing the oxidation of molybdenum. FIG. 5 shows the results of the test of maintaining the integrity of the precipitate material by adding a small amount of metal aluminum as in Example 1. The dark part in black denotes molybdenum oxide, and the light part in white denotes molybdenum. Unlike FIG. 4, in FIG. 5, from the distribution of a large number of white dots denoting molybdenum, it was confirmed that the oxidation of molybdenum was prevented by adding aluminum.

<Experimental Example 3> High-Temperature Compression Creep Test

Figure 6:
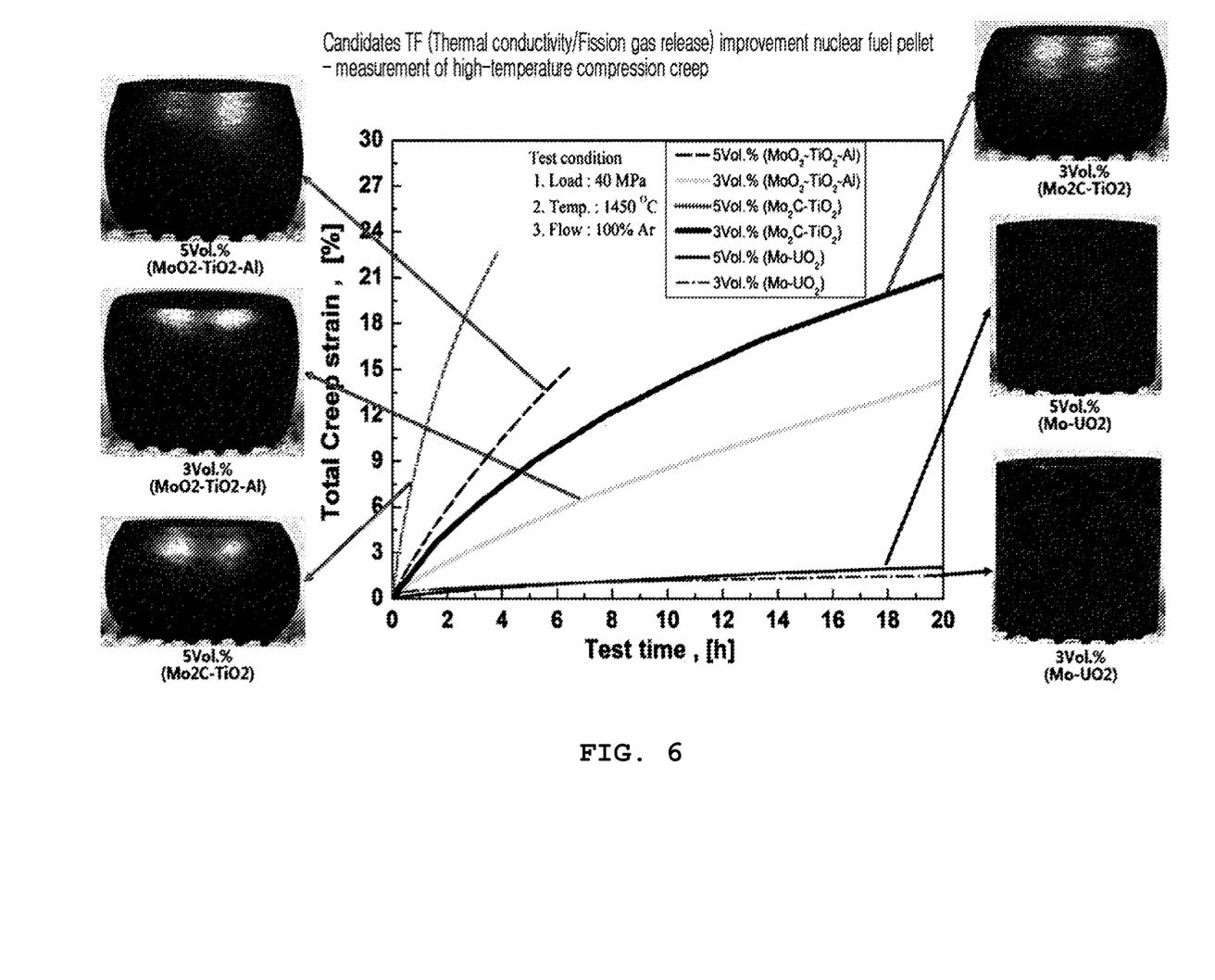
FIG. 6 is a graph showing the time-dependent compression creep deformation of the uranium dioxide sintered pellets according to Examples 1 to 4 and Comparative Example 1 of the present invention after a high-temperature compression creep test.

In order to investigate the high-temperature deformation characteristic of an nuclear-fuel sintered pellet based on oxide in which a plate-type fine precipitate material was dispersed in a circumferential direction according to Examples 1 to 4 and Comparative Example 1 of the present invention, the following high-temperature compression creep test was performed. After the uranium dioxide sintered bodies having the compositions of Examples 1 to 4 and Comparative Example 1 were manufactured, high-temperature compression creep test specimens were manufactured. After the cross sections of the two terminal ends of the manufactured sintered pellet specimen were uniformly cut, the diameter and length of the specimen were measured in order to evaluate the amount of deformation of the specimen after the high-temperature compression creep test. In the high-temperature compression creep test, a compression load of 40 MPa was applied in a hydrogen gas atmosphere at a temperature of 1450° C. for about 20 hours using high-temperature creep test equipment manufactured for that purpose by Zwick/Roell in Germany. In the high-temperature compression creep test, the deformation amount depending on time is measured and then stored in real time using a non-contact laser extensometer when a compressive load of 40 MPa is applied thereto. As shown in FIG. 6, it was confirmed that the high-temperature compression creep deformation amounts of Examples 1 to 4 of the present invention were at least 5 to 20 times as large as the high-temperature compression creep deformation amount of the commercial uranium dioxide sintered body provided in Comparative Example 1.

<Experimental Example 4> Evaluation Test of Thermal Conductivity

Figure 7:
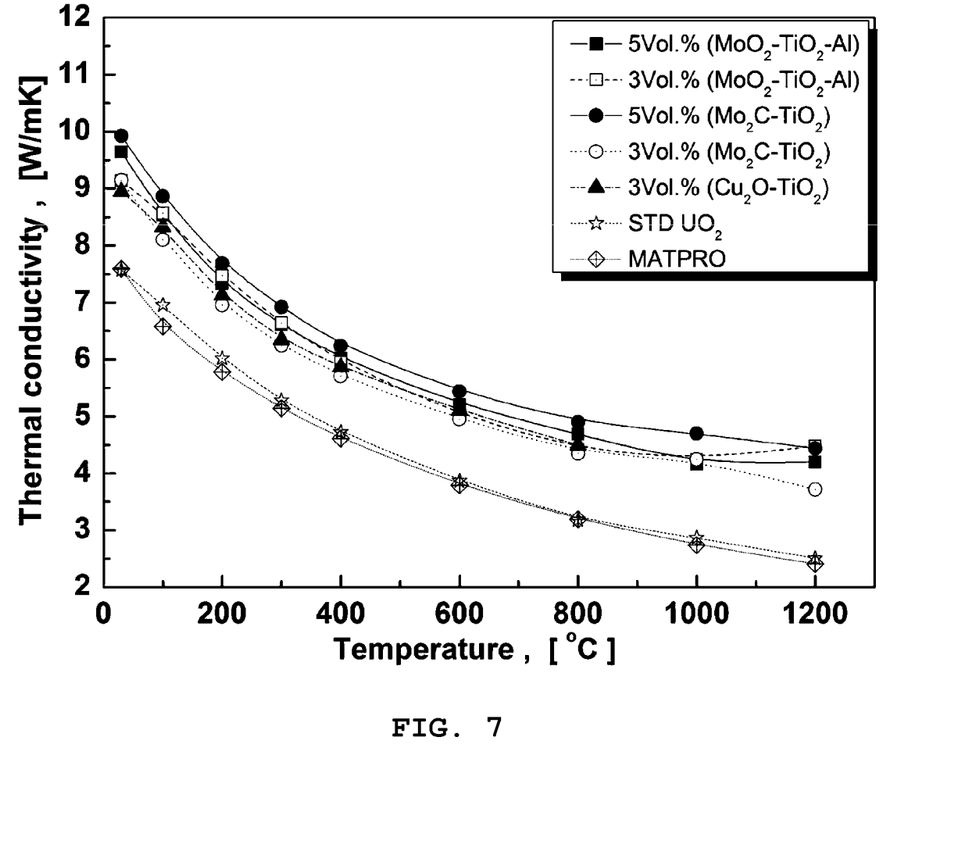
FIG. 7 is a graph showing the comparison of time-dependent thermal conductivity changes of uranium dioxide sintered pellets containing a sintering additive according to Examples 1 to 5 and Comparative Example 1 of the present invention and of a conventional uranium dioxide sintered pellet.

The thermal conductivity of the uranium dioxide sintered pellet depends on density, porosity, chemical equivalents, temperature, and the concentration of impurities. Thermal conductivity, which is a thermal property, is an intrinsic property of a material, and is calculated as a function of the density, specific heat capacity, and thermal diffusivity of the material. The thermal conductivity of the uranium dioxide sintered body depends on density, porosity, chemical equivalents, temperature, and the concentration of impurities. In order to evaluate the thermal conductivity of uranium dioxide, it is necessary to obtain the thermal diffusivity using a laser flash method. The thermal diffusivity value was measured using an LFA 427 model manufactured by Netzsch company in Germany, the density was measured using the Archimedes method, and the specific heat value was calculated using a specific-heat calculation method in the composites. The density, the specific heat, and the thermal diffusivity were multiplied to calculate the thermal conductivity depending on the temperature. FIG. 7 shows the comparative evaluation of the thermal conductivities of the sintered pellets of Examples 1 to 5 and Comparative Example 1 of the present invention. As shown in the drawing, the thermal conductivities of Examples 1 to 5 were about 40 to 70% higher than that of Comparative Example 1. This result is believed to be because molybdenum oxides and chromium carbides were completely precipitated into metal molybdenum to form a uniform plate shape during the sintering process and because the thermal conductivity was greatly improved due to the effect of dispersion of a two-dimensional donut shape.

The present invention described above is not limited by the above-described embodiments and the accompanying drawings, and those skilled in the art will appreciate that various substitutions, modifications, and changes are possible, without departing from the technical spirit of the present invention.

What is claimed is:

1. A nuclear-fuel sintered pellet based on oxide manufactured using an oxide to which at least one of a group including uranium (U), plutonium (Pu), gadolinium (Gd), and thorium (Th) is added, the nuclear-fuel sintered pellet comprising:
   a precipitate material generated due to a sintering additive during a sintering process in a microstructure of nuclear-fuel sintered pellet thereof,
   wherein the precipitate material is uniformly dispersed in a circumferential direction, and wherein the precipitate material forms a donut-shaped two-dimensional precipitate cluster.

2. The nuclear-fuel sintered pellet of claim 1, wherein the precipitate material is disposed along a crystal grain boundary.

3. The nuclear-fuel sintered pellet of claim 1, wherein the precipitate material has a length of 3 to 30 μm and a thickness of 1 to 10 μm.

4. The nuclear-fuel sintered pellet of claim 1, wherein an addition amount of the sintering additive is 0.5 to 10.0 wt % based on the oxide for the nuclear-fuel sintered pellet.

5. The nuclear-fuel sintered pellet of claim 1, wherein the sintering additive includes at least one of a group including copper (I) oxide (CuO), copper (II) oxide (Cu2O), chromium carbide (Cr23C6), molybdenum dioxide (MoO2), molybdenum trioxide (MoO3), molybdenum carbide (Mo2C), and molybdenum disilicide (MoSi2).

6. The nuclear-fuel sintered pellet of claim 5, wherein the sintering additive further includes titanium dioxide (TiO2).

7. The nuclear-fuel sintered pellet of claim 6, wherein a content of the titanium dioxide (TiO2) is 0.05 to 0.70 wt % based on an oxide for the nuclear-fuel sintered pellet.

8. The nuclear-fuel sintered pellet of claim 5, further comprising:
   a metal aluminum (Al) powder.

9. The nuclear-fuel sintered pellet of claim 8, wherein a content of the metal aluminum powder is 0.01 to 0.10 wt % based on an oxide for the nuclear-fuel sintered pellet.

10. A method of manufacturing an oxide nuclear-fuel sintered pellet in which a plate-type fine precipitate material is dispersed in a circumferential direction, the method comprising:
    mixing an oxide powder, including at least one of a group including uranium (U), plutonium (Pu), gadolinium (Gd), and thorium (Th), with a sintering additive powder, thus manufacturing a mixed powder (first step);
    manufacturing a granulated powder using a sieve after pre-compaction and crushing the mixed powder (second step);
    uniaxially compressing the granulated powder at 300 to 500 MPa, thus manufacturing a nuclear-fuel green pellet (third step);
    performing primary sintering of the manufactured nuclear-fuel green pellet in a hydrogen-containing reducing gas atmosphere at a sintering temperature of about 700 to 1100° C. (fourth step); and
    performing secondary sintering in a hydrogen-containing reducing gas atmosphere at a sintering temperature of 1700 to 1800° C. successively after the primary sintering is completed,
    wherein the nuclear-fuel sintered pellet comprises:
    a precipitate material generated due to a sintering additive during a sintering process in a microstructure of nuclear-fuel sintered pellet thereof,
    wherein the precipitate material is uniformly dispersed in a circumferential direction, and wherein the precipitate material forms a donut-shaped two-dimensional precipitate cluster.

11. The method of claim 10, wherein, in the secondary sintering, after completion of the primary sintering, sintering is performed at a condition of 1700 to 1800° C. for 60 to 240 minutes at a heating rate of 1 to 10° C./min without cooling so that a sintering additive in a liquid state is precipitated into a plate-type fine precipitate material and is then disposed homogeneously in a circumferential direction while crystal grains of a nuclear-fuel sintered pellet based on oxide grow.

12. The method of claim 10, wherein a hydrogen-containing reducing gas contains at least one of a group including carbon dioxide, nitrogen, argon, and helium gases.

13. The method of claim 10, wherein a hydrogen-containing reducing gas contains only a hydrogen gas.

14. The method of claim 10, wherein the sintering additive powder includes at least one of a group including copper (I) oxide (CuO), copper (II) oxide (Cu2O), chromium carbide (Cr23C6), molybdenum dioxide (MoO2), molybdenum trioxide (MoO3), molybdenum carbide (Mo2C), and molybdenum disilicide (MoSi2).

15. The method of claim 14, wherein a sintering additive further includes titanium dioxide (TiO2).

16. The method of claim 15, wherein a content of the titanium dioxide (TiO2) that is added is 0.05 to 0.70 wt % based on an oxide for a nuclear-fuel sintered pellet.

17. The method of claim 15, wherein a metal aluminum (Al) powder is further added.

18. The method of claim 10, wherein in the primary sintering, heating is performed at a heating rate of 1 to 10° C./min so that sintering is performed at a condition of 300 to 1100° C. for 30 to 120 minutes, thereby maintaining a sintering additive in a liquid state.

19. The method of claim 18, wherein, when a sintering additive powder is copper (I) oxide (CuO) or copper (II) oxide (Cu2O), in the primary sintering (fourth step), a sintering temperature is 300 to 500° C. and a sintering time is 30 to 120 minutes.

* * * * *